United States Patent

Heritier et al.

[11] Patent Number: 6,115,397
[45] Date of Patent: Sep. 5, 2000

[54] LASER SYSTEM PROVIDING POWER RAMP-UP AND METHOD OF OPERATING SAME

[75] Inventors: Jean-Marc Heritier, San Jose; Francois Moya, Los Altos, both of Calif.

[73] Assignee: Hoya Photonics, Inc., Santa Clara, Calif.

[21] Appl. No.: 09/295,686

[22] Filed: Apr. 21, 1999

[51] Int. Cl.[7] .................................................. H01S 3/00
[52] U.S. Cl. ................................. 372/33; 372/69
[58] Field of Search .................. 372/33, 7, 69, 372/81

[56] References Cited

U.S. PATENT DOCUMENTS 5,132,980  7/1992  Connors et al. ...................... 372/33
5,472,748  12/1995  Wolfe et al. .

*Primary Examiner*—Leon Scott, Jr.
*Attorney, Agent, or Firm*—Majestic, Parsons, Siebert & Hsue, P.C.

[57] ABSTRACT

In a laser system which produces radiation which is highly absorbed by water, the pump voltage supplied to the laser rod is slowly increased between the lasing threshold voltage and the full operational voltage of the pump. As a result, the output energy and circulating energy of the system slowly increase, such that any water on the intracavity coatings is vaporized slowly, rather than explosively. The laser system and method of using same thus reduce or prevent damage to the intracavity coatings used within the laser cavity.

22 Claims, 4 Drawing Sheets

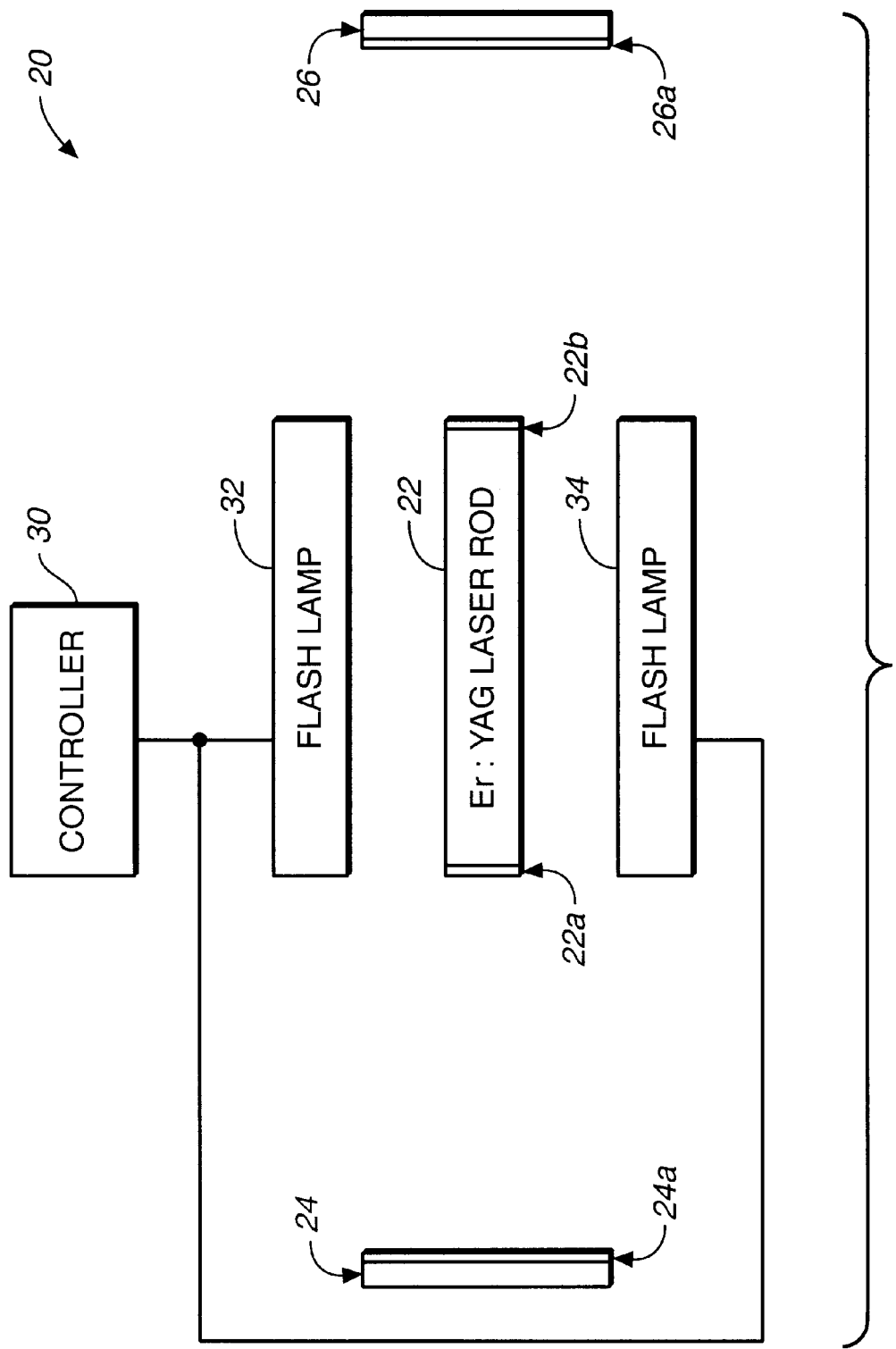
FIG._1

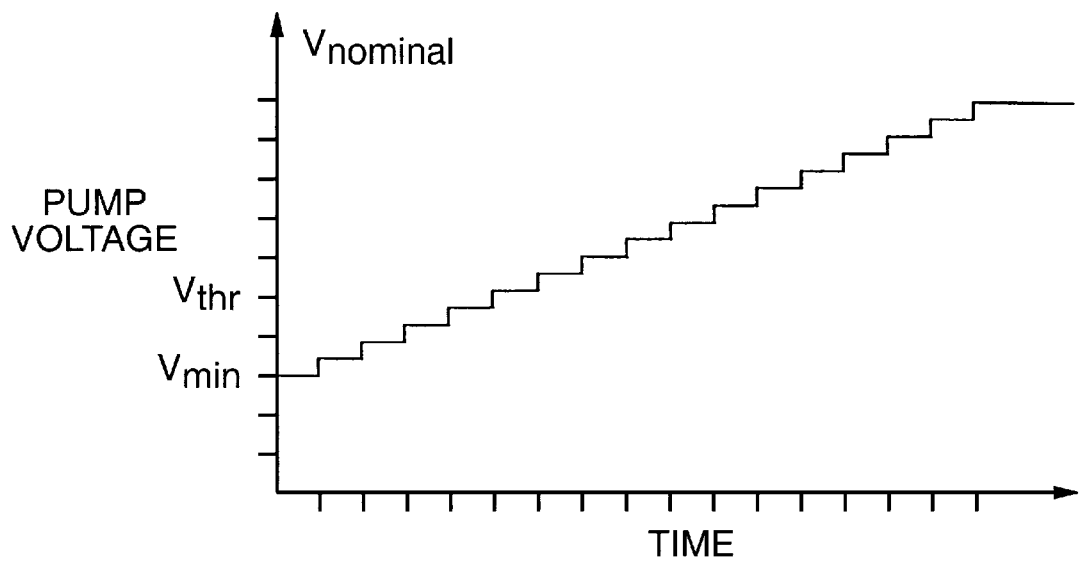
FIG._2A
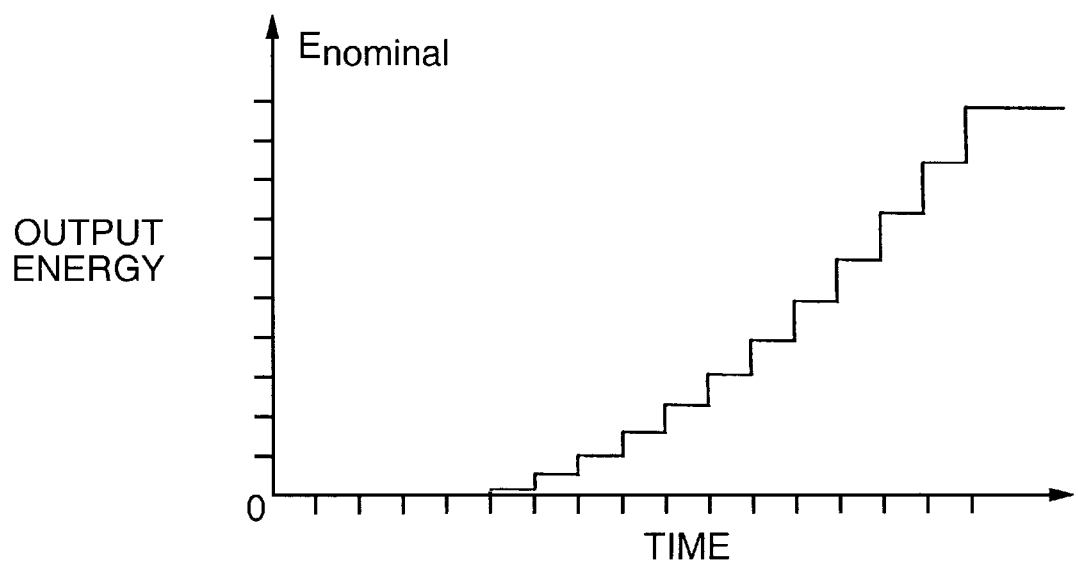
FIG._2B

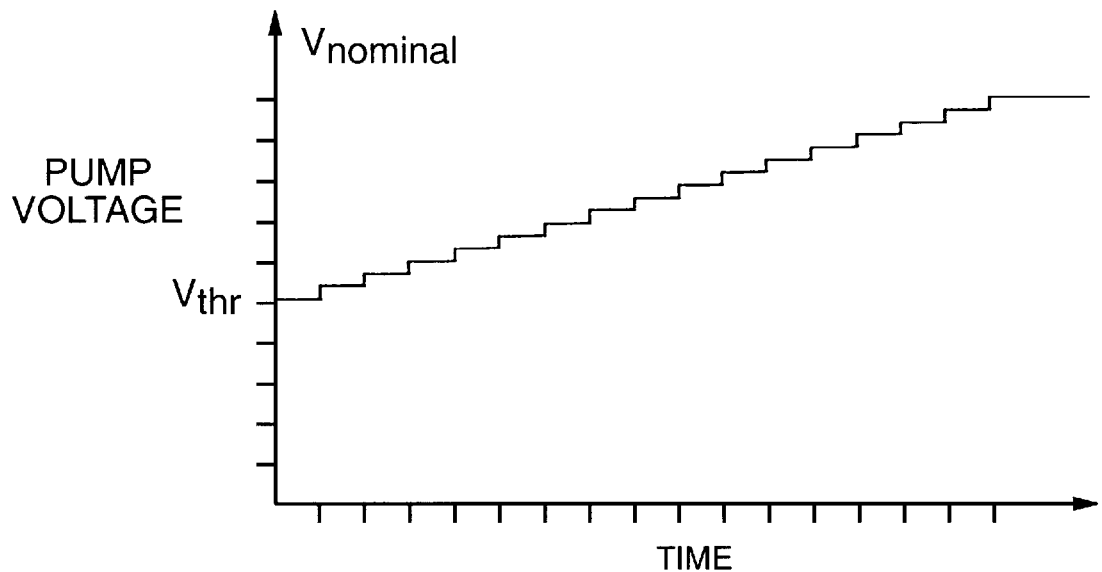
FIG._3A
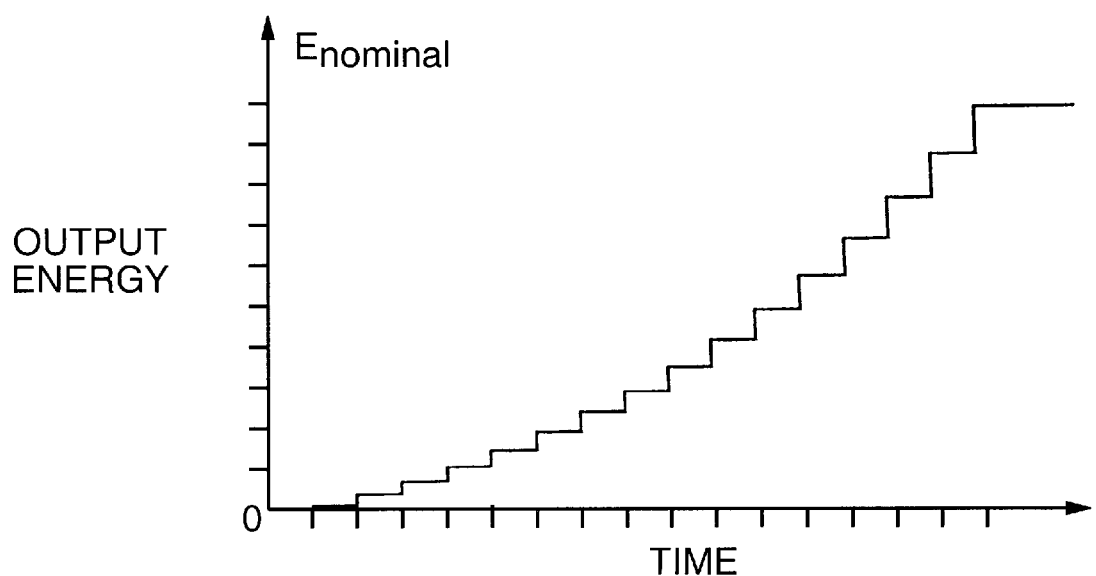
FIG._3B

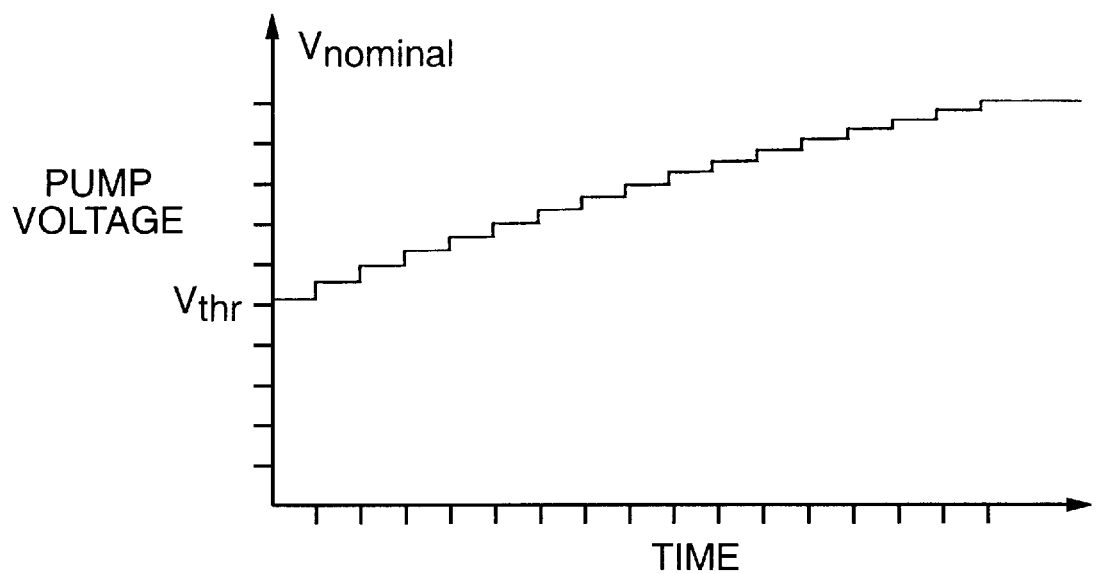
FIG._4A
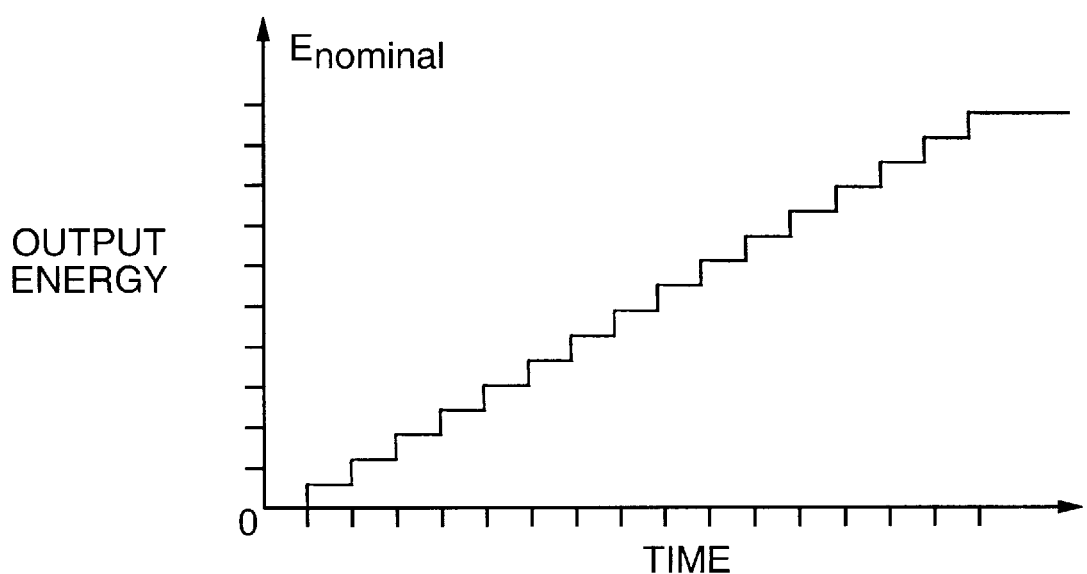
FIG._4B

LASER SYSTEM PROVIDING POWER RAMP-UP AND METHOD OF OPERATING SAME

FIELD OF THE INVENTION

The present invention generally relates to a laser system and a method of operating same. More particularly, the present invention relates to a method of operating a laser system to provide energy that is highly absorbed by water.

BACKGROUND OF THE INVENTION

Lasers operating at wavelengths that are highly absorbed by water are useful in medical and dental applications, as they can be used to provide energy that is highly absorbed by biological material. The Er:YAG (Erbium-doped Yttrium Aluminum Garnet) laser is one such laser, having a highly doped host material or crystal that emits coherent radiation having a wavelength of about 2.94 microns. The Er:YAG laser has been used in dental applications in which the laser radiation is used to vaporize dentine. With such a laser, a dentist can remove the decayed portion of a tooth quite simply, without resorting to a conventional dental drill. Lasers such as the Er:YAG laser can be used in other dental applications, such as tooth-whitening and soft-tissue work. Such lasers can also be used in non-dental applications, such as skin resurfacing.

Er:YAG lasers have a much lower gain than that of Nd:YAG (Neodymium-doped Yttrium Aluminum Garnet) lasers. Thus, an output coupler providing very high reflectivity is used to get good extraction efficiency from Er:YAG lasers. This results in a circulating energy that is quite high, even when moderate pumping energy is used. Because of this high circulating energy, the cavity optics of an Er:YAG laser need to have large damage thresholds.

A problem with reflectivity coatings used in lasers such as the Er:YAG laser is that they tend to absorb moisture or water from the atmosphere. These optical coatings are typically composed of thin layers, which often contain voids that increase the surface area of the coating and allow more moisture or water to be absorbed by the coating. When an Er:YAG laser is used, the moisture or water strongly absorbs the output radiation at its 2.94 micron wavelength, resulting in a violent moisture or water vaporization process which can lead to permanent damage to the cavity optics.

In U.S. Pat. No. 5,132,980 to Connors et al., the authors describe a method for pre-conditioning the gain medium of a laser prior to laser emission. This method is described as being useful for pre-conditioning lasers such as Ho:YAG (Holmium-doped Yttrium Aluminum Garnet) and Nd:YAG lasers, which tend to form thermal lenses when pumped. According to this method, initial energy is supplied to the gain medium to establish a stable thermal lens before additional energy is supplied to the gain medium to produce laser emission. The initial energy consists of below-threshold pump voltages which are insufficient to produce laser emission. The authors describe their pre-conditioning method as avoiding initial (pre-lasing) damage to the cavity optics which would otherwise result from operation in an unstable resonator regime. The method of Connors et al. is thus directed to a particular damage problem associated with certain lasers.

Damage associated with moisture or water vaporization, however, has not been adequately addressed. For example, the below-threshold pump voltages used in the Connors et al. method do not effect a desirable vaporization of moisture or water from the coatings of the cavity optics such that damage to the optics is avoided.

It is therefore desirable to have an improved method and apparatus for operating lasers to avoid damage to cavity optics that is associated with violent moisture or water vaporization.

SUMMARY OF THE INVENTION

The present invention relates to a method of removing absorbed moisture or water from an optical coating before operating the laser at full power. In this method, the laser pump energy is ramped up to effect a slow increase in the energy that reflects on, or gets transmitted through, the cavity optics. As the circulating energy increases, the moisture or water which has been absorbed by the optical coating slowly vaporizes. By the time the energy reaches the full nominal output power, the optical coating is moisture-or water-free and will not be damaged during operation at full power.

According to an embodiment of the present invention, the pump voltage of the laser is increased in small increments, such that the laser goes from zero to full voltage in about 10 to about 20 seconds. The pump voltage can be increased from a minimum value to a nominal value in about 32 even steps, with a step change or two every second for a total warm-up time of about 32 or about 16 seconds. According to an alternate embodiment, the pump voltage is increased from a lasing threshold voltage, which is the pump voltage at which the laser begins to lase. According to yet another alternate embodiment, the pump voltage is changed in variable steps such that the output energy linearly increases from zero to its full nominal value.

The method of the present invention is most usefully employed in connection with lasers whose output radiation is highly absorbed by water, such as lasers whose output radiation corresponds to a water absorption coefficient of greater than or equal to about 200 $cm^{-1}$, and more particularly, lasers whose output radiation corresponds to a water absorption coefficient of about 500 $cm^{-1}$ or more. By way of example, such lasers include the Er:YAG laser whose output radiation wavelength of 2.94 microns corresponds to a water absorption coefficient of about 3,000 $cm^{-1}$. Thus, the present invention also relates to a laser system which can be operated according to the inventive method.

Additional objects, advantages and features of the present invention will become apparent from the description of preferred embodiments, set forth below, which should be taken in conjunction with the accompanying drawings, a brief description of which follows.

BRIEF DESCRIPTION OF THE DRAWINGS

FIG. 1 is a schematic illustration of an apparatus according to the present invention.

FIG. 2A is a graphic representation of the pump voltage versus time according to an embodiment of the present invention.

FIG. 2B is a graphic representation of the output energy versus time according to the embodiment shown in FIG. 2A.

FIG. 3A is a graphic representation of the pump voltage versus time according to an alternate embodiment of the present invention.

FIG. 3B is a graphic representation of the output energy versus time according to the embodiment shown in FIG. 3A.

FIG. 4A is a graphic representation of the pump voltage versus time according to another alternate embodiment of the present invention.

FIG. 4B is a graphic representation of the output energy versus time according to the embodiment shown in FIG. 4A.

DETAILED DESCRIPTION OF PREFERRED EMBODIMENTS

FIG. 1 is a schematic illustration of an apparatus or system according to the present invention. The system 20 includes a highly doped Er:YAG laser rod 22, which is used to produce laser radiation having a wavelength of about 2.94 microns. An optical cavity is provided between cavity mirrors 24 and 26 positioned beyond the ends of the laser rod 22. Typically, the cavity mirrors 24 and 26 are coated with optical coatings 24a and 26a, respectively, on surfaces facing the ends of the laser rod 22. Additionally, the ends of the laser rod 22 are coated with anti-reflection coatings 22a and 22b, respectively. In an alternate embodiment, at least one of the ends of the laser rod 22 is coated with a mirror coating.

During operation of the system 20, the cavity mirror 26 acts as an output coupler, transmitting a portion of the laser energy produced from the laser cavity, while reflecting the remaining laser energy within the laser cavity. As Er:YAG lasers have a much lower gain (for example, about 9% single-pass gain) than Nd:YAG lasers, a very highly reflective output coupler is used to get good extraction efficiency. According to one embodiment, the output coupler 26 reflects about 96 percent of the laser energy and transmits only the remaining about four percent. When such a highly reflective output coupler is used, the circulating energy inside the laser cavity becomes quite high even when moderate output energies are produced.

On the surface of the output coupler or mirror 26 is optical coating 26a, which tends to absorb moisture or water. The coatings 22a, 22b and 24a also tend to absorb moisture or water. These coatings are formed by placing thin layers of material onto a substrate in order to obtain the desired reflective or transmissive qualities. These layers often contain voids which increase the surface area of the coating and allow moisture or water to be absorbed by the coating.

The Er:YAG laser rod produces laser radiation having a wavelength of about 2.94 microns, which corresponds to a water absorption coefficient of about 3,000 $cm^{-1}$. This absorption coefficient corresponds to a 1/e distance of about 3 microns. In other words, a 30-nanometer thick layer of water on an intracavity coating will absorb about 1 percent of the laser energy produced. If, for example, the coating 26a were to transmit about four percent of the laser energy produced, about one quarter of the output energy would be absorbed by this 30-nanometer thick layer of water on the coating. When moisture or water absorbs this amount of energy, it vaporizes explosively. During conventional operation of the laser, an audible popping sound is produced as the moisture or water vaporizes explosively from the coating. This explosive vaporization eventually damages the intracavity coatings. Merely by way of example, such damage may be observed as markings on the coatings (visible to the naked or aided eye) or may be determined by mapping the reflectivity of the coating.

There are two main factors that bring about the explosive vaporization of moisture or water when even moderate pump energies are used. The first factor relates to a property of water, namely, that water highly absorbs certain laser energy (as reflected by an "absorption coefficient of water" or "water absorption coefficient"). In a preferred embodiment, the method is used in connection with lasers producing laser radiation for which water has an absorption coefficient of greater than or equal to about 200 $cm^{-1}$. In a more preferred embodiment, method is used in connection with lasers producing laser radiation for which water has an absorption coefficient of greater than or equal to about 500 $cm^{-1}$. The second factor relates to a property of the intracavity coating 26a, namely, that the coating 26a transmits a low percentage (such as 1–20% or 4–9%) of the laser energy produced. Because of this low transmissivity, the circulating energy in the laser cavity can be very large even when a moderate pump energy is used.

As shown in FIG. 1, the system 20 includes a controller 30 connected to two flashlamps 32 and 34, although a single flashlamp, a diode, other suitable energy source, or combination thereof could be used. The flashlamps 32 and 34 supply the energy to pump the Er:YAG laser rod 22. In a preferred embodiment, the controller 30 controls the flashlamps in such a way that the pump energy supplied to the Er:YAG laser rod is ramped up slowly. Typically, flashlamps are controlled by the pump power or voltage supplied thereto. Thus, the pump power or voltage supplied to the flashlamps can be slowly ramped up to effect a slow increase in the pump energy supplied to the laser rod. This slow increase in pump energy causes the output power or energy to increase slowly, once the pump energy has increased beyond the threshold pump energy required for laser emission. The slow ramping up of output power or energy allows moisture or water vaporization from the intracavity coatings to occur more slowly than it does when the laser is operated conventionally.

The slow vaporization process afforded by the present invention occurs only after the lasing threshold (as represented by a threshold power or voltage, for example) of the laser rod has been reached. This is contrary to the method of Connors et al., in which the laser rod is pre-conditioned or warmed up using below-threshold voltage. The system of the present invention is usefully employed at a relatively low pump repetition rate, such as about 2–50 Hertz or about 10 Hertz, as it is the energy of each pulse that matters rather than the temperature of the rod.

FIG. 2A is a graphical illustration of the supplied pump voltage (for example, in V or kV) versus time (in seconds), according to a method of the present invention. This system is slowly ramped up from the minimum voltage in small increments. As shown in FIG. 2B, after the pump voltage reaches the voltage threshold, the output energy (for example, in mJ) slowly increases.

FIG. 3A is a graphical illustration of the supplied pump voltage versus time, according to an alternate embodiment. As illustrated, the initial pump voltage is slightly above the threshold voltage and is ramped up thereafter. This reduces the delay time in operation. As shown in FIG. 3B, the increase in output energy over time is not strictly linear. This is because the pump energy is related to the square of the pump voltage and the output energy is somewhat proportional to the pump energy after the voltage threshold is reached.

FIG. 4A is a graphical illustration of the supplied pump voltage versus time, according to another alternate embodiment. As illustrated, the voltage is increased in a non-linear manner (FIG. 4A) so that the output energy increases substantially linearly over time (FIG. 4B). The embodiment illustrated in FIGS. 4A and 4B requires a precise control of the pump voltage.

By way of example, the quantities referenced in FIGS. 2A–4B may be as follows: the nominal voltage may be from about 600 V to about 1.6 kV, a typical value being about 1 kV; the threshold voltage may be from about one-half to about two-thirds of the nominal voltage; and the nominal output energy may be from about 200 mJ to about 500 mJ.

The time shown in these graphical illustrations may be from about 1 to about 2 seconds per mark on the x-axis. Typically, a time of about 5 seconds or more, such as from about 5 to about 15 seconds, will be sufficient for ramping up the pump power to effect the desired water vaporization.

The embodiments described above involve ramping up the pump voltage in discrete steps. In any of these embodiments, the controller 30 could be a computer or an electronic control system sufficient to effect the stepped profile. Alternately, the increase could be effected using a smooth, continuous ramp-up profile. In this alternate embodiment, the controller 30 could be a computerized or an electronic control system sufficient to ramp-up the pump voltage according to a smooth, continuous profile. Graphical illustrations of this alternative embodiment would simply include a smooth curve in place of the stepped profile in FIGS. 2A, 3A and 4A, and a stepped profile in FIGS. 2B, 3B and 4B similar to that already shown for the previously described embodiments (given the time-sampling of the output energy).

The present invention provides a laser system and an associated method which are employed to avoid violent moisture or water vaporization from the intracavity coatings and thereby reduce or prevent damage to the cavity optics. While the invention has been described in terms of solid state lasers, a laser which produces radiation at a wavelength highly absorbed by water, but whose active material is other than a solid state material, could be used.

Although various aspects of the present invention have been described with respect to the preferred embodiments thereof, it will be understood that the invention is entitled to protection within the full scope of the appended claims.

It is claimed:

1. A method of operating a laser, comprising:

providing a laser which produces radiation of a wavelength corresponding to a water absorption coefficient that is greater than or equal to about 200 cm$^{-1}$, the laser having at least one intracavity optical coating which absorbs moisture; and ramping up a pump power supplied to the laser to vaporize moisture in the coating without causing vaporization damage to the coating.

2. The method of claim 1, wherein said ramping up comprises ramping up the pump power in discrete intervals.

3. The method of claim 1, wherein said ramping up comprises ramping up the pump power in a substantially continuous manner.

4. The method of claim 1, wherein said ramping up comprises increasing the pump power between a lasing threshold power and a nominal power.

5. The method of claim 4, wherein said ramping up comprises increasing the pump power from an initial power near or above the lasing threshold power.

6. The method of claim 1, wherein said ramping up comprises increasing the pump power so that an output power increases in a substantially linear manner.

7. The method of claim 1, wherein said ramping up comprises increasing the pump power over about 5 seconds or more.

8. The method of claim 1, wherein said ramping up comprises increasing the pump power via computer control.

9. The method of claim 1, wherein said providing comprises providing a laser having an Erbium-doped YAG rod.

10. The method of claim 1, wherein said providing comprises providing a laser having a relatively low gain rod.

11. A laser system, comprising:

a laser including a laser rod and at least one intracavity optical coating which absorbs moisture, said laser producing radiation of a wavelength corresponding to a water absorption coefficient that is greater than or equal to about 200 cm$^{-1}$;

a pump source for supplying pump energy to the laser rod; and a controller for controlling the pump energy supplied to the laser rod, said controller adapted to ramp up the pump power supplied to the laser rod to vaporize the moisture in the coating without causing vaporization damage to the coating.

12. The laser system of claim 11, wherein said controller is adapted to ramp up the pump power over about 5 seconds or more.

13. The laser system of claim 11, wherein said controller comprises a computer.

14. The laser system of claim 11, wherein the laser rod comprises an Erbium-doped YAG rod.

15. The laser system of claim 11, wherein the laser rod comprises a relatively low gain rod.

16. A method of operating a laser, comprising:

providing a laser, the laser producing radiation of a wavelength which is absorbed by water, the laser having at least one intracavity optical coating which absorbs moisture, the laser having a normal power, operation at which would normally cause vaporization damage to the coating upon vaporization of moisture from the coating; and ramping up a pump power supplied to the laser to vaporize the moisture from the coating without causing vaporization damage to the coating.

17. The method of claim 16, wherein said ramping up comprises ramping up the pump power in discrete intervals.

18. The method of claim 16, wherein said ramping up comprises ramping up the pump power in a substantially continuous manner.

19. The method of claim 16, wherein said ramping up comprises ramping up the pumping power over about 5 seconds or more.

20. The method of claim 16, wherein said ramping up comprises ramping up under computer control.

21. The method of claim 16, wherein said providing comprising providing a laser having an Erbium-doped YAG rod.

22. The method of claim 16, wherein the ramping up step includes increasing the pump power between a lasing threshold power and a nominal power.

* * * * *